United States Patent
Watanabe et al.

(10) Patent No.: US 7,620,315 B2
(45) Date of Patent: Nov. 17, 2009

(54) IMAGE TAKING MAIN UNIT

(75) Inventors: Mikio Watanabe, Miyagi (JP); Eiji Ishiyama, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 583 days.

(21) Appl. No.: 11/381,385

(22) Filed: May 4, 2006

(65) Prior Publication Data
US 2008/0292306 A1    Nov. 27, 2008

(30) Foreign Application Priority Data
May 11, 2005    (JP)    ............................. 2005-138656

(51) Int. Cl.
*G03B 17/14* (2006.01)
(52) U.S. Cl. ...................... 396/268; 396/287; 396/448; 396/529
(58) Field of Classification Search ................ 396/268, 396/448, 529, 535, 287; 348/211.14, 360, 348/373–376
See application file for complete search history.

(56) References Cited

U.S. PATENT DOCUMENTS 4,728,977 A * 3/1988 Yomogizawa et al. ....... 396/349
6,088,535 A * 7/2000 Katano et al. ................. 396/72
2004/0062545 A1* 4/2004 Ushiro ........................ 396/529
2005/0212948 A1* 9/2005 Watanabe et al. ............ 348/340
2005/0212949 A1* 9/2005 Tokiwa et al. ............... 348/340
2006/0088314 A1* 4/2006 Matsushita et al. .......... 396/529
2007/0077062 A1* 4/2007 Senba et al. ................. 396/529
2008/0002968 A1* 1/2008 Arai ........................... 396/448

FOREIGN PATENT DOCUMENTS

| JP | 8-171130 A | 7/1996 |
| JP | 2003-060962 A | 2/2003 |
| JP | 2003-156790 A | 5/2003 |
| JP | 2005-316437 A | * 11/2005 |

* cited by examiner

*Primary Examiner*—W B Perkey
(74) *Attorney, Agent, or Firm*—Sughrue Mion, PLLC (57) ABSTRACT

The present invention provides an image taking main unit that prevents entry of foreign matter and has excellent usability even when an image taking lens unit is not attached thereto. The image taking main unit has a concave mount to which the image taking lens unit with an image taking optical system and an imaging device is removably attached and receives image signals from the image taking lens unit attached thereto to record the image signals therein. The image taking main unit also has a barrier and an electronic device disposed on the barrier. The barrier covers an opening of the mount and retracts into the concave portion of the mount by being pressed by the image taking lens unit when the image taking lens unit is attached to the image taking main unit.

4 Claims, 8 Drawing Sheets

IMAGE TAKING MAIN UNIT

BACKGROUND OF THE INVENTION

1. Field of the Invention

The present invention relates to an image taking main unit which receives image signals from an image taking lens unit removably attached thereto and records the image signals therein.

2. Description of the Related Art

Conventionally, there has been disclosed a lens-interchangeable camera in which an image taking lens unit is removably attached to and electrically connected to an image taking main unit through connectors (see, for example, Japanese Patent Application Publication No. 2003-156790, pp. 1-pp. 3, FIG. 1). According to such a lens-interchangeable camera, dust or foreign matter settling on connectors, through which an image taking lens unit is electrically connected to an image taking main unit, can cause poor electric connection resulting in anomalies. Static electricity discharged from foreign matter in connectors may even destruct electronic elements of an image taking main unit.

However, according to the lens-interchangeable camera disclosed in Japanese Patent Application Publication No. 2003-156790, the connector section of the image taking main unit is exposed when the image taking lens unit is not attached to the image taking main unit. Thus this technique has the problem that dust or foreign matter settling on the connector section may cause poor connection and result in anomalies.

In order to deal with such a problem, Japanese Patent Application Publication No. 1996-171130 (pp. 2-pp. 5, FIG.4) discloses another type of lens-interchangeable camera which provides a barrier on the front of the image taking main unit, in which the image taking lens unit is removably inserted. The camera has two positions; one is where the barrier is opened to allow the image taking lens unit to be removably inserted therein; and the other is where the barrier is closed when the image taking lens unit is not attached to the image taking main unit. According to the technique, the presence of the barrier protects the inside of the image taking main unit even when the image taking lens unit is not attached thereto.

However, the camera disclosed in Japanese Patent Application Publication No. 1996-171130 still has the problem that space for the barrier is not utilized when the image taking lens unit is not attached to the image taking main unit. Because of the recent demand for a smaller and more compact image taking main unit in view of portability, it is necessary to utilize both the outside and the inside of an image taking main unit.

SUMMARY OF THE INVENTION

The present invention has been made in view of the above circumstances, and provides an image taking main unit which prevents the entry of foreign matter therein and has excellent usability even when an image taking lens unit is not attached thereto.

An image taking main unit of the present invention has a concave mount to which an image taking lens unit with an image taking optical system and an imaging device is removably attached, and that receives image signals from the image taking lens unit attached thereto, the image taking main unit including:

a barrier that covers an opening of the mount and, retracts into a concave portion of the mount by being pressed by the image taking lens unit when the image taking lens unit is attached to the image taking main unit; and an electronic device disposed on the barrier.

Disposing the electronic device on the barrier enables enhanced usability of the image taking main unit even when the image taking lens unit is not attached thereto.

Preferably, the image taking main unit has a contact mechanism configured to supply power to and activate the electronic device according to a motion of the barrier when the image taking lens unit is not attached to the image taking main unit, and to stop power supply to the electronic device according to a motion of the barrier when the image taking lens unit is attached to the image taking main unit.

Such a contact mechanism allows the image taking main unit to automatically supply power to the electronic device on the barrier.

More preferably, the electronic device is an image taking module for performing image taking operation instead of the image taking lens unit when the image taking lens unit is not attached to the image taking main unit.

Such a configuration allows the image taking main unit to perform simple image taking operation such as snapshots in addition to full-fledged image taking operation by the image taking lens unit and results in enhanced usability of the image taking main unit.

It is also preferable that the electronic device is a display module for displaying an image.

Accordingly, it is possible to display, on the display module, information received from an external device or processed inside the image taking main unit, resulting in enhanced usability of the image taking main unit.

As described above, the present invention can realize an image taking main unit which prevents the entry of foreign matter therein and has excellent usability even when an image taking lens unit is not attached thereto.

DETAILED DESCRIPTION OF THE INVENTION

Embodiments of the present invention will be described below with reference to the attached drawings.

Figure 1:
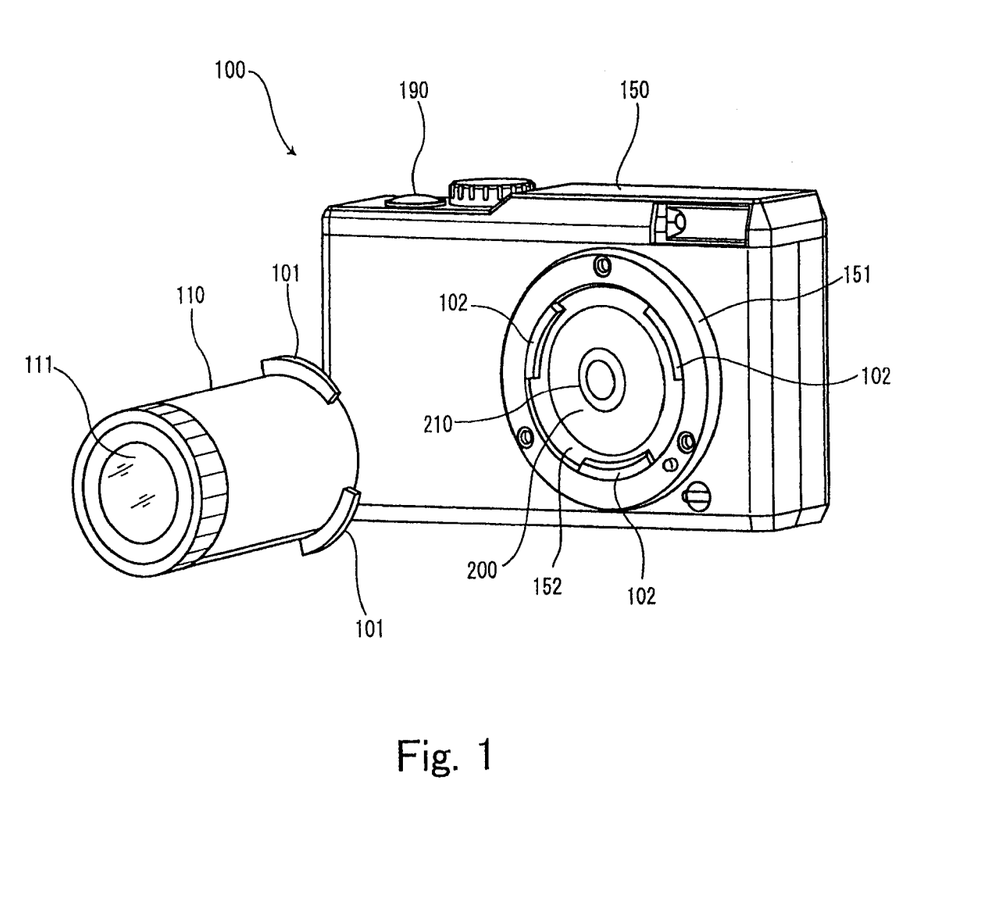
FIG. 1 is a perspective external view of an image taking main unit according to a first embodiment of the present invention and an image taking lens unit which is to be attached to the image taking main unit.

FIG. 1 is a perspective external view of an image taking main unit 150 of a first embodiment and an image taking lens unit 110 to be attached to the image taking main unit 150.

As shown in FIG. 1, the image taking main unit 150 has a concave mount 151 to which the image taking lens unit 110 provided with an image taking optical system 111 and an imaging device 112 (see FIG. 2) is removably attached. The image taking lens unit 150 receives signals from the image taking lens unit 110 attached to the mount 151 thereof and records the signals therein. The image taking lens unit 150 and the image taking lens unit 110 constitute an interchangeable-lens camera system 100.

The interchangeable-lens camera system 100 of the present invention employs a so-called bayonet mount mechanism. More specifically, projections 101 formed on the base of the image taking lens unit 110 are adapted to engage with engaging portions 102 formed inside the concave mount 151, thereby causing the image taking lens unit 110 to engage the image taking main unit 150.

The image taking main unit 150 has a barrier 152 and an image taking device 200 disposed on the barrier 152. The barrier 152 covers the opening of the mount 151 and retracts into the concave portion of the mount 151 pushed by the image taking lens unit 110 when the image taking lens unit 110 is attached to the image taking main unit 150.

In the first embodiment, the image taking module 200 is disposed as an electronic device that performs image taking operation in place of the image taking lens unit 110 when the image taking lens unit 110 is not attached to the image taking main unit 150. The image taking module has, for example, a short-focus lens 210 capable of being miniaturized and a relatively compact CCD (not shown) incorporated therein. Upon turning on of a release button 190 of the image taking main unit 150, a CPU 154 (see FIG. 2) of the image taking main unit 150 controls the image taking module to take an image and thereafter, an image taken by the image taking module is processed and recorded in a memory card 180 (see FIG. 2).

As described above, the image taking main unit 150 of the first embodiment enables simple image taking operation, for example, for snapshots even when the image taking lens unit 110 is not attached to the image taking main unit 150.

It should be noted that an electronic device to be disposed on the barrier is not limited to the image taking module 200 which will be described later in detail and may be an image display module or another device with a different function.

As described before, when the image taking lens unit 110 is attached to the image taking main unit 150, the barrier 152 is pushed by the image taking lens unit 110 to retract into the depth of the concave portion of the mount 151. FIG. 1 shows the barrier 152 retracted into the depth of the concave mount 151. In such a state, the image taking lens unit 110 comes in contact with the surface of the barrier 152 and thus the grounds of both the image taking lens unit 110 and the image taking main unit 150 are electrically connected each other to be at the same potential. Then, by rotating the image taking lens unit 110 to a predetermined direction, the projections 101 of the image taking lens unit 110 are caused to engage with the engaging portions 102 inside the mount 151 of the image taking main unit 150. As a result, electric contacts of both the image taking lens unit 110 and the image taking main unit 150 are electrically connected each other, and the image taking lens unit 110 is completely attached to the image taking main unit 150.

It should be noted that the camera system 100 is not limited to rotational engagement between the projections 101 and the engaging portions 102 and may adopt other type of engagement, for example, by only pushing the image taking lens unit 110 against the mount 151 of the image taking main unit 150.

Additionally, the image taking main unit 150 of the embodiment has an electric contact mechanism, which will be described later in detail, configured to supply power to the image taking device 200 when the image taking lens unit 110 is not attached and to stop supplying power to the image taking device 200 when the image taking lens unit 110 is attached. Such supplying and stop supplying power to the image taking device 200 is performed according to a motion of the barrier 152.

Figure 2:
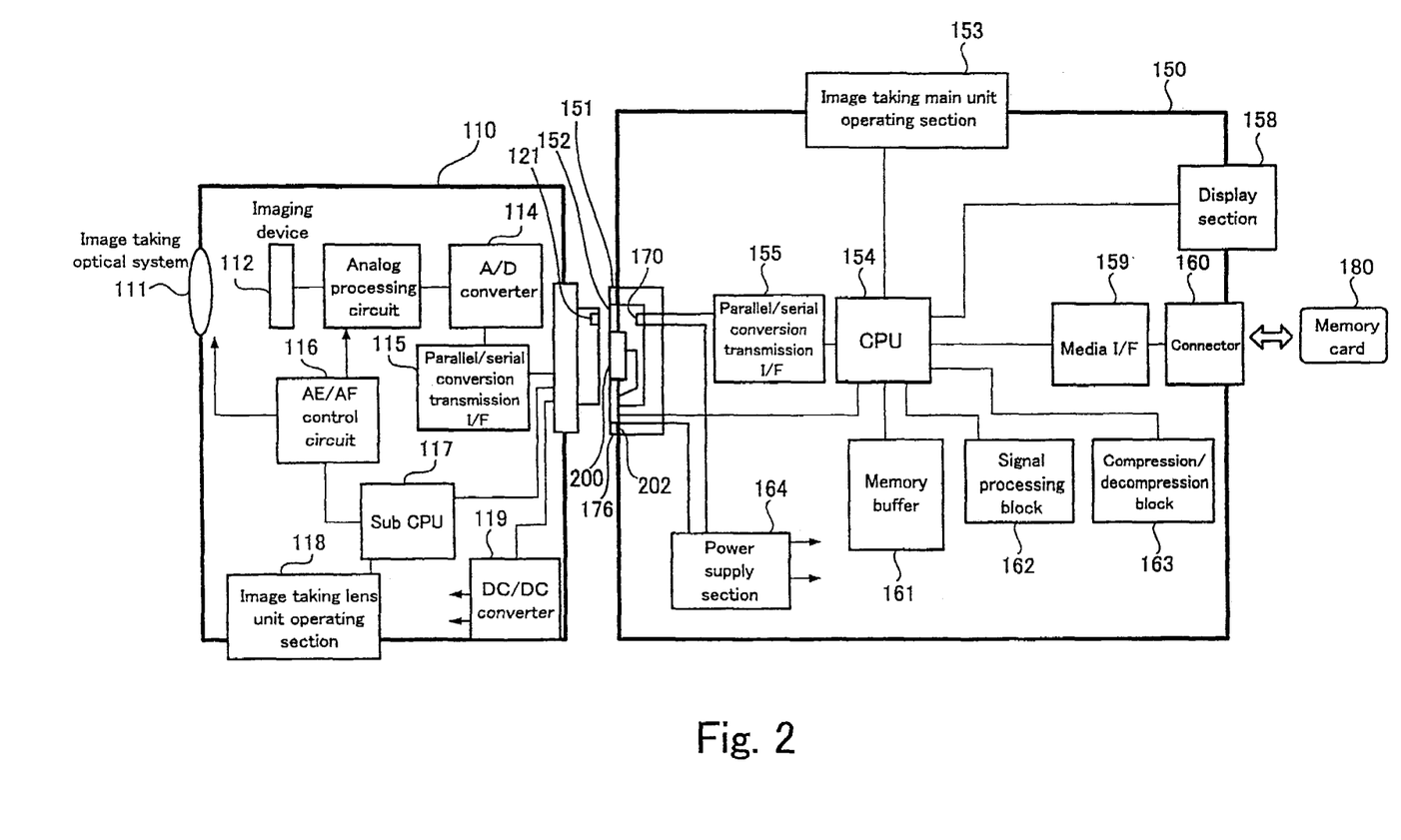
FIG. 2 is a block diagram of the image taking main unit of the first embodiment and the image taking lens unit.

The image taking lens unit 110 has the image taking optical system 111 and the imaging device 112 (FIG. 2). The image taking main unit 150 has an electric contact 170 (see FIG. 2 through 4) for allowing communication between the mount 151 and the image taking lens unit 110 inserted in the mount 151. The image taking main unit 150 also has the barrier 152 that covers the opening of the mount 151 and retracts into the depth of the concave portion of the mount 151 pushed by the image taking lens unit 110 when it is attached to the image taking main unit 150. Thus, the image taking main unit 150 is allowed to communicate with the image taking lens unit 110 attached to the mount 151 and receive image signals to perform signal processing.

FIG. 2 is a block diagram of the image taking main unit 150 of the first embodiment and the image taking lens unit 110.

As shown in FIG. 2, the image taking main unit 150 has the concave mount 151 to which the image taking lens unit 110 with the image taking optical system 111 and the imaging device 112 is removably attached. Thus the image taking main unit 150 is allowed to communicate with the image taking lens unit 110 attached to the mount 151 and receive image signals to perform signal processing. The image taking lens unit 110 and the image taking main unit 150 constitutes the camera system 100 (FIG. 1).

The image taking lens unit 110 is provided with an electric contact 121 for electrical connection with the image taking main unit 150; image taking lens unit operating section 118 for receiving operating instructions from a user; AE/AF control circuit 116 for performing automatic exposure and focus control; sub Central Processing Unit (CPU) 117 for controlling operation performed at each section in the image taking lens unit 110; and DC/DC converter 119 for converting DC voltage received from the image taking main unit 150 through the electric contact 121 into DC voltage required by each section of the image taking lens unit 110 to supply the converted DC voltage thereto.

Image signals are output from the imaging device 112 after image taking operation by the image taking optical system 111. The image signals (CCD_RAW), after going through gain adjustment and noise reduction processing, are converted into digital signals by Analog/Digital converter 114 and then into serial signals by parallel/serial conversion transmission interface 115 and are sent to the image taking main unit 150 via the electric contact 121 of the image taking lens unit 110 and the electric contact 170 of the image taking main unit 150. As the imaging device 112, Charge Coupled Devices (CCD), Complementary Metal Oxide Semiconductor (CMOS) and the like may be employed.

The electric contact 121 of the image taking lens unit 110, the mount 151, the barrier 152 and the electric contact 170 of the image taking lens unit 150 will be described later in detail referring to FIGS. 3 and 4.

The image taking main unit 150 is provided with the image taking device 200; the electric contact 170; the mount 151; the barrier 152; an image taking main unit operating section 153 for receiving operating instructions from a user; CPU 154 for controlling the image taking main unit 150 in its entirety; signal processing block 162 for applying the white balance correction and the γ correction to CCD_RAW signals received from the image taking lens unit 110 and converting CCD_RAW signals into YcbCr signals (brightness/hue-difference signal); memory buffer 161 for temporarily storing CCD_RAW signals, YcbCr signals and compressed data; parallel/serial conversion transmission interface 155 for performing parallel-serial conversion of signals received from and sent to the image taking lens unit 110; compression/decompression block 163 for compressing and decompressing YcbCr signals; display section 158 such as Liquid Crystal Display for displaying image information obtained by converting digital signals stored in the memory buffer 161 into analog signals; media interface 159 and connector 160 for recording compressed image data in an external storage device such as a memory card 180; and power supply section 164 for supplying power via the electric contact 170 to each section of the image taking lens unit 110.

It should be noted that the first embodiment shown in FIG. 2 is one example according to the invention and the invention is not to limited to the first embodiment. For example, it is possible to incorporate variable elements and functions into the image taking main unit of the invention to constitute other types of camera systems provided with, for example, various types of image taking lenses, the number of pixels of CCD, movie shooting/still image shooting, with/without auxiliary mechanism such as camera shake correction, with multiple CCD and lenses for stereoscopic photography. Thus it is possible that the image taking main unit according to the invention may be used in such various types of camera systems depending on a different application.

Now, referring to FIG. 3, explanation will be made about before and after the image taking lens unit 110 is attached to the image taking main unit 150 of the first embodiment.

Figure 3:
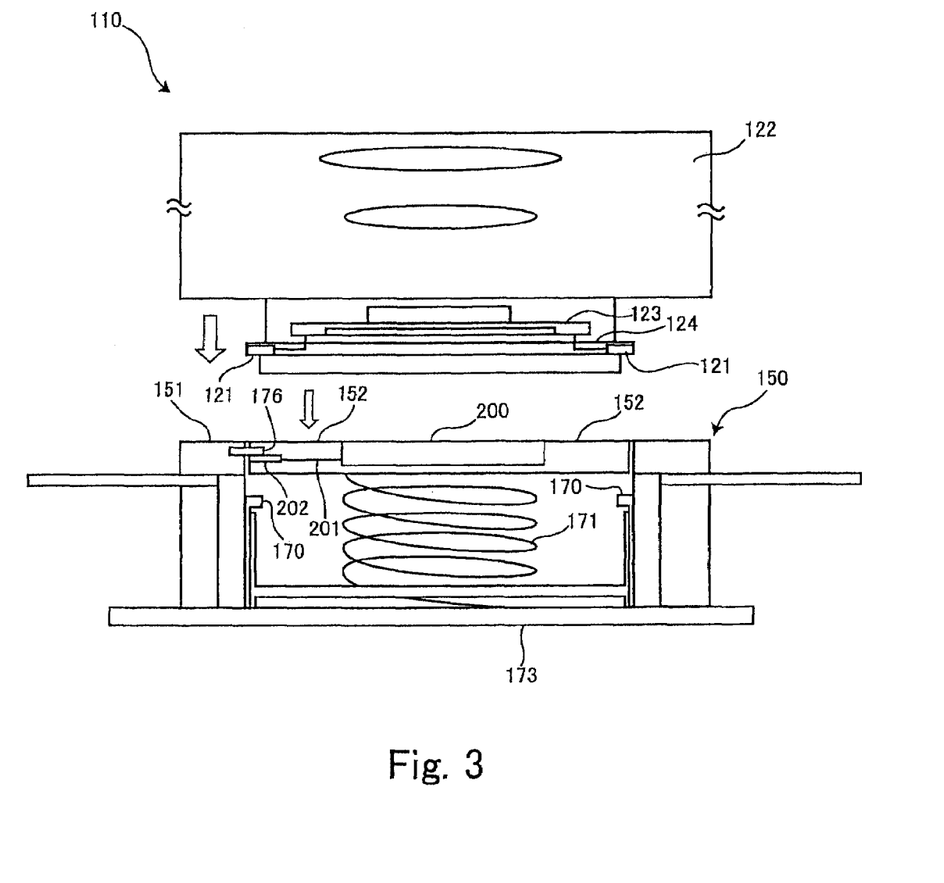
FIG. 3 is a sectional view of the image taking main unit of the first embodiment and the image taking lens unit before the image taking lens unit is attached to the image taking main unit.

FIG. 3 is a sectional view of the image taking main unit and the image taking lens unit of the first embodiment.

In the upper part of FIG. 3, the image taking lens unit 110 is shown, which is yet to be attached to the image taking main unit 150.

The image taking main unit 150 is provided with the mount 151 to which the image taking lens unit 110 is removably attached. The electric contact 170 and the barrier 152 are provided inside the mount 151. The electric contact 170 are connected to a circuit board 173 with elements such as the CPU 154 (see FIG. 2) mounted thereon. Thus, connecting the electric contact 121 of the image taking lens unit 110 to the electric contact 170 of the image taking main unit 150 allows receiving and sending signals between the image taking lens unit 110 and the image taking main unit 150.

As described earlier, the barrier 152 covers the opening of the mount 151 and retracts into the concave portion of the mount 151 pressed by the image taking lens unit 110 when the image taking lens unit 110 is attached to the image taking main unit 150. The barrier 152 is also connected to the circuit board 173 through a spring 171 provided inside the image taking main unit 150.

The barrier 152, which is formed of conductive material such as aluminum, protects the electric contact 170 from becoming electrostatically charged and prevents entry of foreign matter into the inside of the image taking main unit. The image taking device 200 is provided on the barrier 152.

According to the embodiment, the barrier 152 has a first barrier contact 202 and a second barrier contact 176. The first barrier contact 202 is connected to the image taking device 200 through a conductor 201. The second barrier contact 176 is connected to the power supply section 164 (see FIG. 2) at the inside of the image taking main unit 150. The first barrier contact 202 and the second barrier contact 176 are configured to supply power to and activate the image taking device 200 when the image taking lens unit 110 is not attached to the image taking main unit 150, and stop supplying power to inactivate the electronic device 20 when the image taking lens unit 110 is attached. In other words, to supply and stop supplying power to the image taking device 200 is performed according to a motion of the barrier 152.

Accordingly, when the image taking lens unit 110 is not attached to the image taking main unit 150 as shown in FIG. 3, the first barrier contact 202 is connected to the second barrier contact 176 and thus the image taking device 200 is supplied with power and in the activated state.

The image taking lens unit 110 is also provided with the electric contact 121 which are connected to a circuit board 123 with elements such as the sub CPU 117 (see FIG. 2) mounted thereon. The electric contact 121 are positioned away from the image taking main unit 150, when the image taking lens unit 110 is not attached to the image taking main unit 150, and become electrically connected to the electric contact 170 when the image taking lens unit 110 attached to the image taking main unit 150 pushes the barrier 152 into the concave portion of the mount 151.

Additionally, the electric contact 121 are connected to a conductor 124 that serves as an electric ground of the circuit board 123 in the image taking lens unit 110. When the image taking lens unit 110 is attached to the image taking main unit 150, the electric contact 121 abut ground contacts (not shown) formed on the barrier 152 of the image taking main unit 150, so that connection of grounds between the image taking lens unit 110 and the image taking main unit 150 is established.

The barrier 152 is caused to cover the opening of the mount 151 urged by the spring 171. The barrier 152 retracts into the depth of the concave portion of the mount 151 when the image taking lens unit 110 is attached to the image taking main unit 150, but goes back to the original position to cover the opening of the mount 151 urged by the spring 171 when the image taking lens unit 110 is detached from the image taking main unit 150. One end of the spring 171 is fixed to the barrier 152 and the other end is fixed to the circuit board 173 with elements mounted thereon.

Such a simple configuration as attachment of the spring 171 to the barrier 152 enables protection of the image taking main unit 150 against destruction or malfunction due to discharge of static electricity and against entry of foreign matter when the image taking lens unit 110 is detached from the image taking main unit 150.

Figure 4:
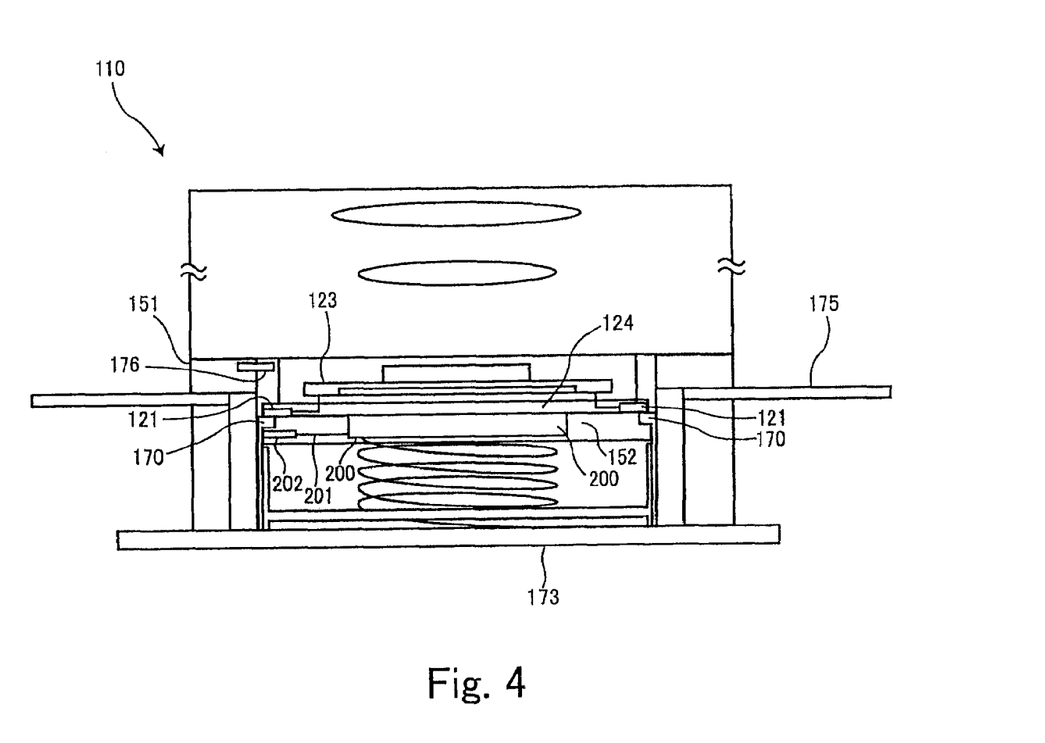
FIG. 4 is a sectional view of the image taking main unit of the first embodiment and the image taking lens unit after the image taking lens unit is attached to the image taking main unit.

FIG. 4 is a sectional view of the image taking main unit 150 and the image taking lens unit 110 of the first embodiment after the image taking lens unit 110 is attached to the image taking main unit 150.

In order to attach the image taking lens unit 110 in the state shown in FIG. 3 to the image taking main unit 150 to become the state as shown in FIG. 4, firstly the image taking lens unit 110 is to push the barrier 152 into the depth of the concave portion of the mount 151 of the image taking main unit 150. Then, rotating the image taking lens unit 110 in a predetermined direction causes the projections 101 thereof (see FIG. 1) to be engaged with the engaging portions 102 (see FIG. 1) of the image taking main unit 150.

The opening of the mount 151 is covered by the barrier 152 when the image taking lens unit 110 is not attached to the image taking main unit 150. However, when the image taking lens unit 110 is attached to the image taking main unit 150, the barrier 152 retracts into the depth of the concave portion of the mount 151 pushed by the image taking lens unit 110. Accordingly, the first barrier contact 202 is detached from the second barrier contact 176 and thus power supply to the image taking device 200 is stopped to inactivate the image taking device 200.

When the image taking lens unit 110 is attached to the image taking main unit 150, the conductor 124 that serves as a ground of the image taking lens unit 110 is connected with the circuit board 173 which serves as a ground of the image taking main unit 150 through the spring 171 and thus both grounds are at the same potential. Therefore, even if the image taking lens unit 110 is held with an electrostatically charged hand while any of non-conductive portions of the image taking main unit 150 is supported with the other hand, it is possible to prevent application of high voltage between the electric contact 170 and the electric contact 121. This is because electric charge having some kilovolts of potential difference is discharged into the image taking main unit 150 before the electric contact 121 approaches the electric contact 170.

In the state where the ground (the conductor 124) of the image taking lens unit 110 is at the same potential as the ground (the circuit board 173) of the image taking main unit 150, the image taking lens unit 110 is inserted into the depth of the concave portion of the mount 151. Then, by rotating the image taking lens unit 110 around an optical axis in a predetermined direction, the electric contact 121 of the image taking lens unit 110 become connected to the electric contact 170 of the image taking main unit 150. The electric contact 121 and 170 respectively consist of multiple electric contacts for the power supply, the grounds, CCD_RAW signals, AE/AF control signals and image taking lens unit control signals. Accordingly, establishment of connection between the electric contact 121 and 170 allows receiving and sending of power supply and signals between the image taking lens unit 110 and the image taking main unit 150. If the release button 190 of the image taking main unit 150 is pressed in the above state to perform image taking operation, signals representing a shot image are transmitted from the image taking lens unit 110 to the image taking main unit 150 and recorded in the memory card 180 (see FIG. 2) after going through processing such as signal conversion and compression.

Additionally, according to the embodiment, when detaching the image taking lens unit 110 from the image taking main unit 150, electric connection between the electric contact 121 and 170 is cut while the image taking lens unit 110 is kept in contact with the barrier More specifically, when the image taking main unit 150 is rotated around an optical axis in the reverse direction of the attachment process to be detached from the image taking main unit 150, connection between the electric contact 121 and 170 is cut while the image taking lens unit 110 is kept in contact with the barrier 152. Only after connection between the electric contact 121 and 170 is completely cut, the ground of the image taking lens unit 110 is detached from the ground of the image taking main unit 150. Accordingly, even if the image taking lens unit 110 is held with an electrostatically charged hand, it is possible to prevent electrostatic discharge to the electric contact 121 of the image taking lens unit 110 or the electric contact 170 of the image taking main unit 150 and thus prevent destruction or malfunction of the elements inside the image taking lens unit 110.

It should be noted that, if an exterior 122 of the image taking lens unit 110 is formed of metallic material, the exterior 122 becomes to have the same potential as both the grounds. Therefore, it is possible to prevent the image taking lens unit 110 in its entirety from destruction or malfunction due to static electricity.

If an exterior 175 (see FIG. 4) of the image taking main unit 150 is formed of metallic material, the exterior 175 connected to the ground becomes to have the same potential as the ground of the image taking main unit irrespective of the state of the barrier 152. Therefore, it is possible to prevent the image taking main unit 110 in its entirety from destruction or malfunction due to static electricity.

Figure 5:
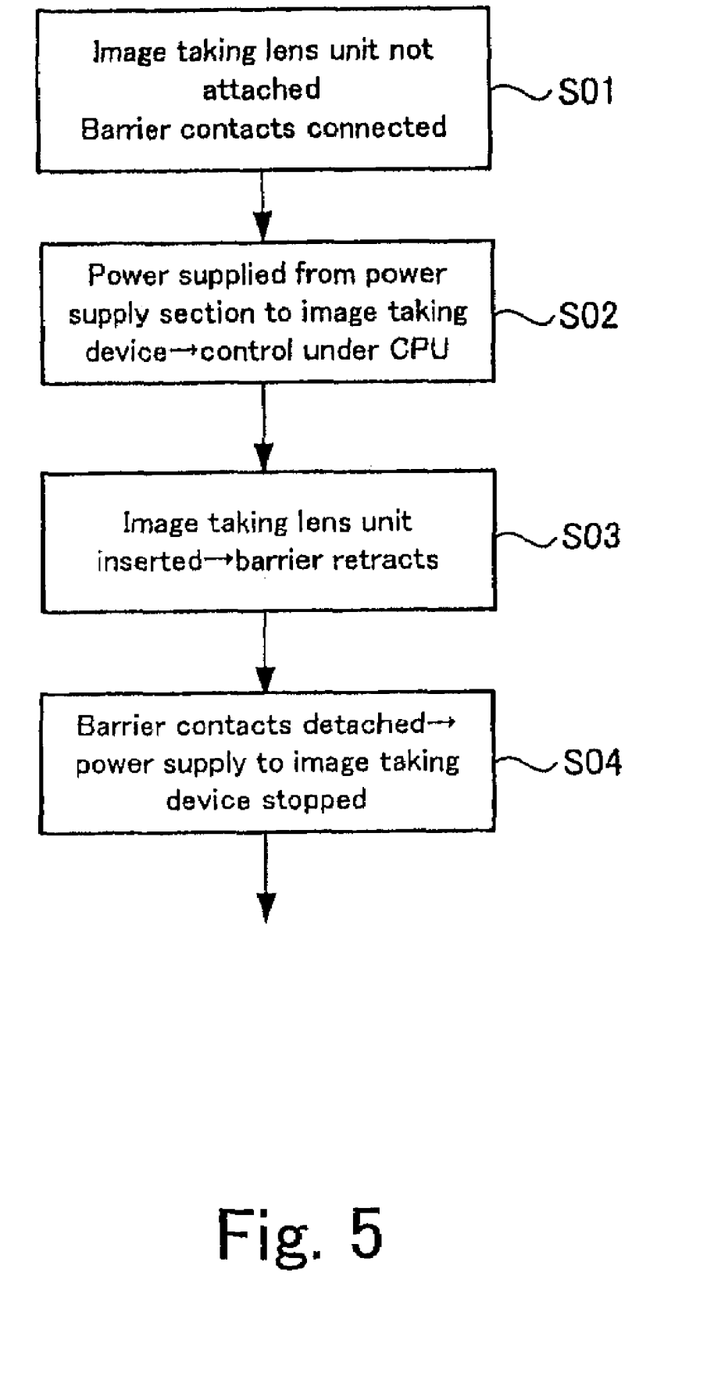
FIG. 5 shows an operating sequence performed in the image taking main unit when the image taking lens unit is attached thereto.

FIG. 5 shows an operating sequence performed in the image taking main unit 150 when the image taking lens unit 110 is attached thereto.

As in step S01 of FIG. 5, the first barrier contact 202 (see FIGS. 2 through 4) is in contact with the second barrier contact 176 (see FIGS. 2 through 4). In this state, the power supply section 164 (see FIG. 2) supplies power to the image taking device 200 (see FIGS. 1 through 4) through the first and second barrier contacts 202 and 176 so that the image taking device 200 is activated to become under control of the CPU 154 (FIG. 2)(Step S02).

Subsequently, when the image taking lens unit 110 is inserted into the opening of the mount 151 of the image taking main unit 150, the barrier 152 retracts into the depth of the concave portion of the mount 151 (step S03), and the first barrier contact 202 is detached from the second barrier contact 176, so that power supply to the image taking device 200 is stopped to inactivate the image taking device 200 (step S04).

Figure 6:
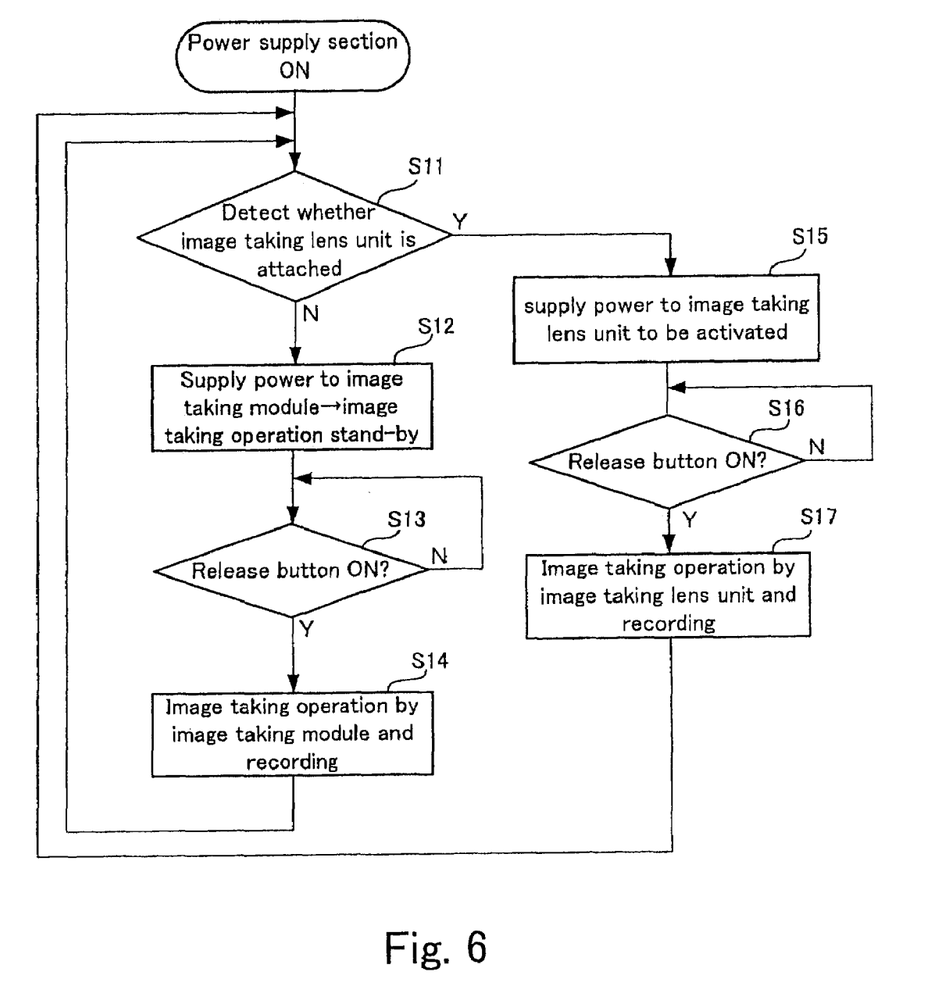
FIG. 6 is a flow diagram showing a process performed by the image taking main unit of the first embodiment.

FIG. 6 is a flow diagram showing a process performed by the image taking main unit 150 of the first embodiment.

As indicated in FIG. 6, upon turning on of the power supply section 164 (FIG. 2), it is detected whether the image taking lens unit 110 is attached (step S11).

If the detection result is No (the image taking lens unit 110 is not attached) in step S11, the flow goes to step S12 where power is supplied from the power supply section 164 to the image taking module 200 (FIGS. 1 through 4) on the barrier 152 via the first barrier contact 202 and the second barrier contact 176 to make the image taking main unit 150 to become stand-by state for image taking operation. Then, upon turning on of the release button 190 by a user (step S13), image taking operation is performed by the image taking module 200 and image data representing a shot image is recorded (step S14). Subsequently, the flow goes back to step S11 and the same procedure from step S11 through step S14 is repeated.

On the other hand, if detection result is Yes (the image taking lens unit 110 is attached) in step S11, the flow goes to step S15 where power is supplied from the power supply section 164 to the image taking lens unit 110 via the first barrier contact 202 and the second barrier contact 176 to activate the image taking lens unit 110. Then, upon turning on of the release button 190 by a user (step S16), image taking operation is performed by the image taking lens unit 110 and image data representing a shot image is recorded (step S17). Subsequently, the flow goes back to step S11 and the same procedure from step S11 through step S17 is repeated.

Now, referring to FIG. 7, explanation will be made about an example of an image taking main unit according to a second embodiment in which a display module is disposed. In the following, description will be made only on the different feature from the first embodiment and components having the same functions as those of the first embodiment are denoted by the same reference characters.

Figure 7:
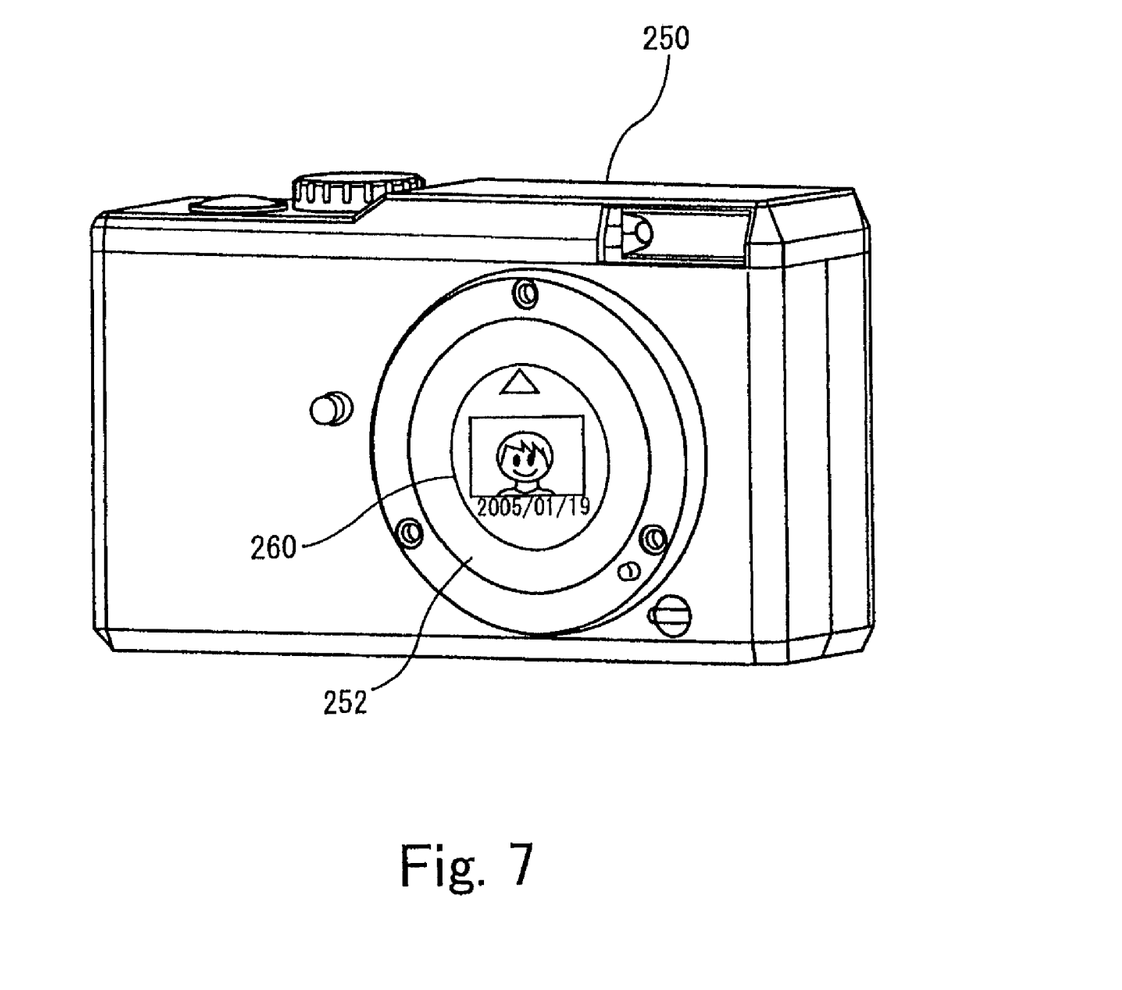
FIG. 7 shows an image taking main unit of a second embodiment.

As shown in FIG. 7, a display module 260 for displaying an image is disposed on a barrier 252 as another example of an electronic device. A device such as Liquid Crystal Display (LCD) or organic Electronic Luminescence (EL) is fixed on the display module 260, so that an image taking main unit 250 can serve as an image reproduction apparatus or TV communication apparatus instead of a camera. Additionally, disposing such a display module on a barrier, in addition to a relatively large display usually provided on the back of the image taking main unit, enables display of date and time or a specific image on the display module.

Figure 8:
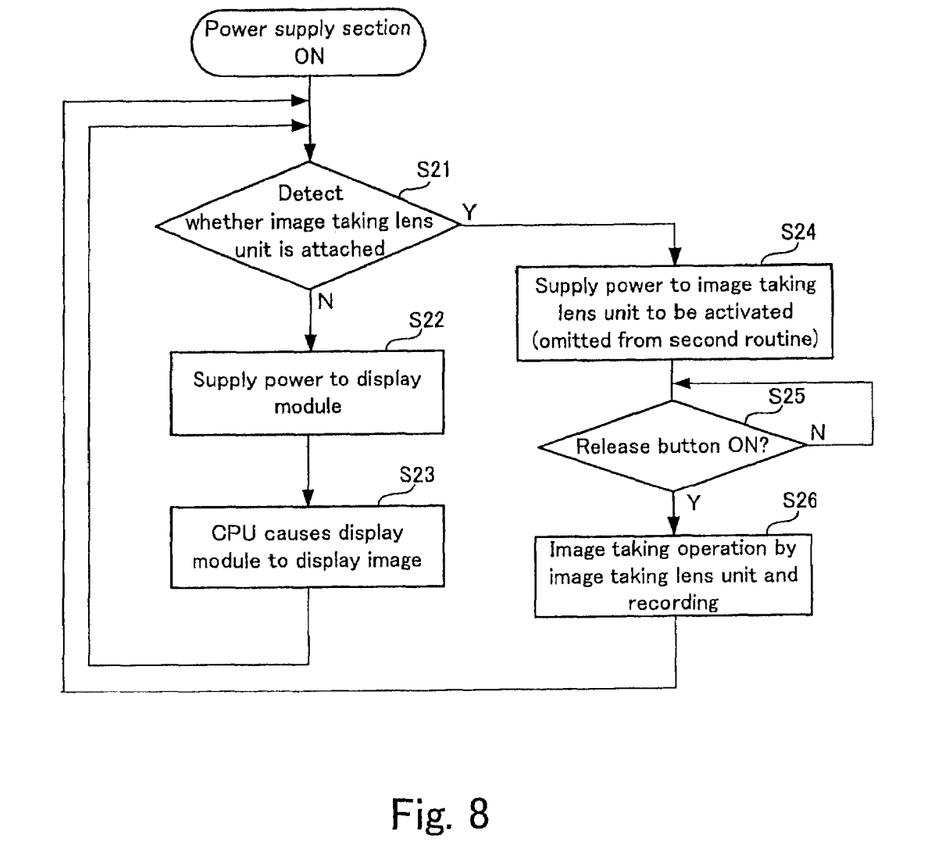
FIG. 8 is a flow diagram showing a process performed by the image taking main unit of the second embodiment.

FIG. 8 is a flow diagram showing a process performed by the image taking main unit 250 of the second embodiment.

As indicated in FIG. 8, upon turning on of the power supply section 164 (FIG. 2), it is detected whether the image taking lens unit 110 is attached (step S21).

If the detection result is No (the image taking lens unit 110 is not attached) in step S21, the flow goes to step S22 where power is supplied from the power supply section 164 to the display module 260 (FIG. 7) on the barrier 252 via the first barrier contact 202 and the second barrier contact 176. Then, in step S23, the CPU 154 (see FIG. 2) causes the display module 260 to display an image. Subsequently, the flow goes back to step S21 and the same procedure from the step S21 through step S23 is repeated.

On the other hand, if detection result is Yes in step S21, the flow goes to step S24 where power is supplied from the power supply section 164 to the image taking lens unit 110 via the first barrier contact 202 and the second barrier contact 176 to activate the image taking lens unit 110. Then, upon turning on of the release button 190 by a user (step S25), image taking operation is performed by the image taking lens unit 110 and image data representing a shot image is recorded (step S26). Subsequently, the flow goes back to the step S21 and the same procedure from step S21 through the step S26 is repeated, but from the second routine activation of the image taking lens unit 110 is not repeated.

In the above description, an image taking module and a display module are employed as examples of the electronic device of the invention. However, an electronic device is not limited to such examples, and another example such as a radio/TV receiving module and an audio replay module may be possible.

What is claimed is:

1. An image taking main unit that has a concave mount to which an image taking lens unit with an image taking optical system and an imaging device is removably attached, and that receives image signals from the image taking lens unit attached thereto and records the image signals therein, the image taking main unit comprising:
   a barrier that covers an opening of the mount and, retracts into a concave portion of the mount by being pressed by the image taking lens unit when the image taking lens unit is attached to the image taking main unit; and
   an electronic device disposed on the barrier,
   wherein the electronic device is an image taking module for performing an image taking operation instead of the image taking lens unit when the image taking lens unit is not attached to the image taking main unit.

2. The image taking main unit according to claim 1, further comprising a contact mechanism configured to supply power to and activate the electronic device according to a motion of the barrier when the image taking lens unit is not attached to the image taking main unit, and to stop supplying power to the electronic device according to a motion of the barrier when the image taking lens unit is attached to the image taking main unit.

3. An image taking main unit that has a concave mount to which an image taking lens unit with an image taking optical system and an imaging device is removably attached, and that receives image signals from the image taking lens unit attached thereto and records the image signals therein, the image taking main unit comprising:
   a barrier that covers an opening of the mount and, retracts into a concave portion of the mount by being pressed by the image taking lens unit when the image taking lens unit is attached to the image taking main unit; and
   an electronic device disposed on the barrier, wherein the electronic device is a display module for displaying an image.

4. The image taking main unit according to claim 3, further comprising a contact mechanism configured to supply power to and activate the electronic device according to a motion of the barrier when the image taking lens unit is not attached to the image taking main unit, and to stop supplying power to the electronic device according to a motion of the barrier when the image taking lens unit is attached to the image taking main unit.

\* \* \* \* \*